Oct. 21, 1941.   T. B. STILLMAN   2,260,062
FUEL BURNER
Filed June 23, 1937   5 Sheets-Sheet 1

INVENTOR.
Thomas B. Stillman
ATTORNEY.

Oct. 21, 1941.　　　T. B. STILLMAN　　　2,260,062
FUEL BURNER
Filed June 23, 1937　　　5 Sheets-Sheet 2
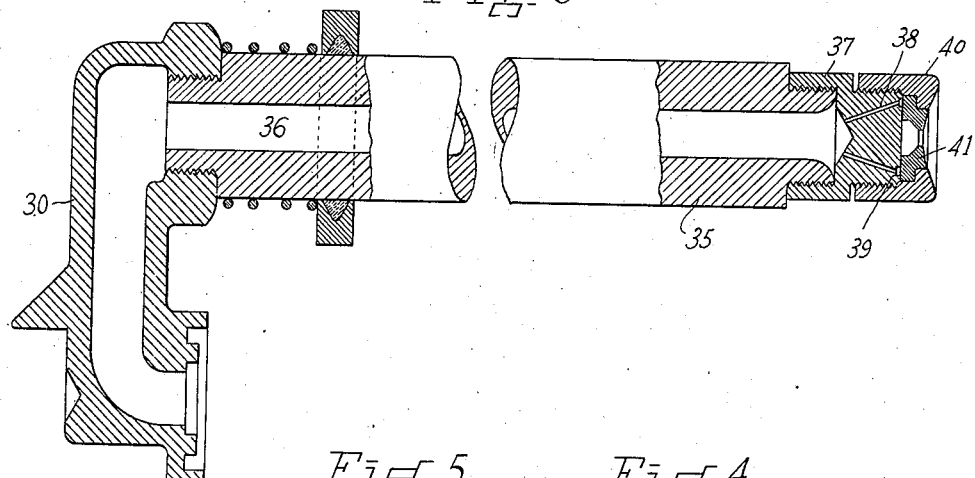
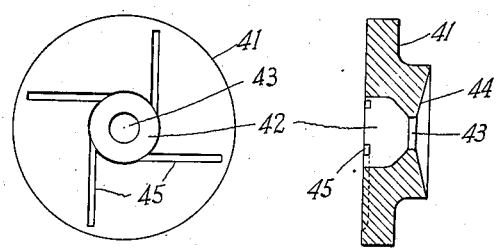
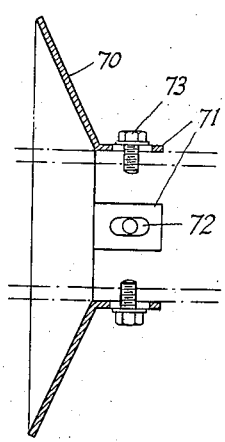
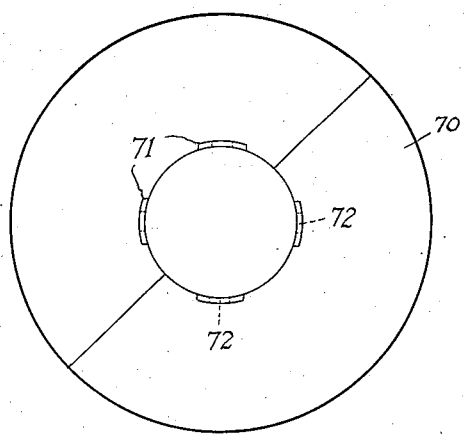
INVENTOR.
Thomas B. Stillman
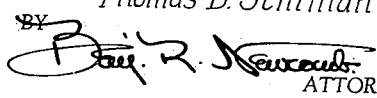
ATTORNEY.

Oct. 21, 1941.   T. B. STILLMAN   2,260,062
FUEL BURNER
Filed June 23, 1937   5 Sheets-Sheet 3
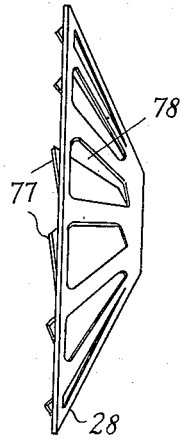
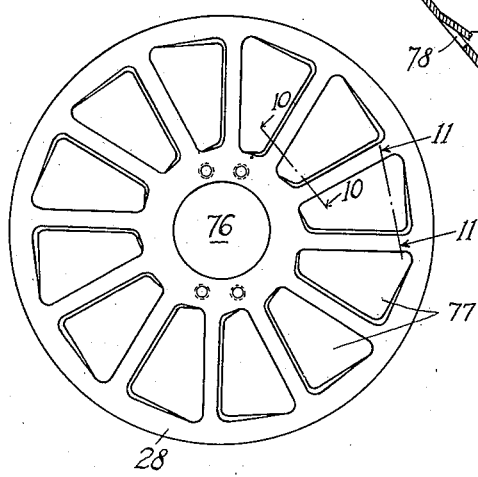
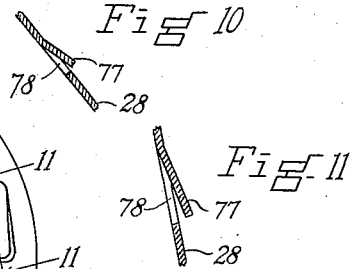
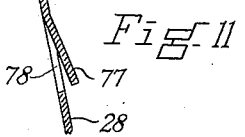
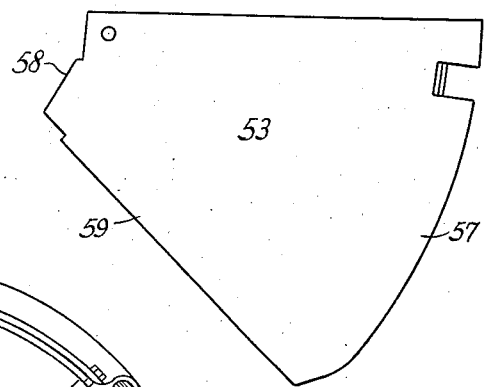
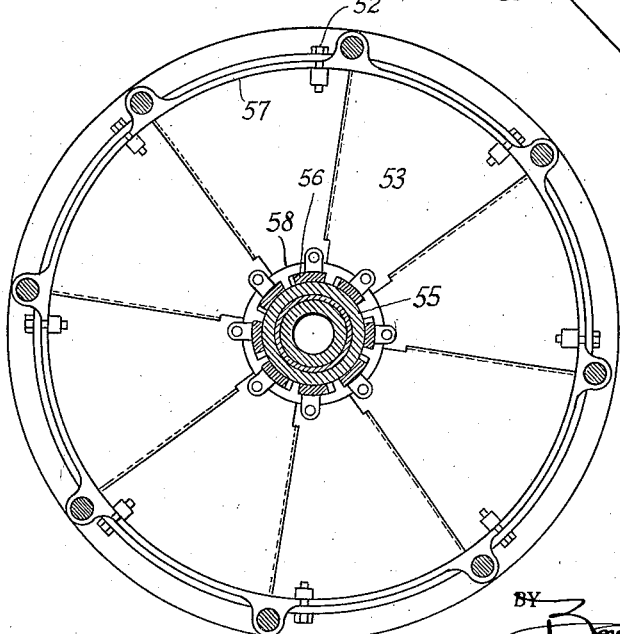
INVENTOR.
Thomas B. Stillman
BY
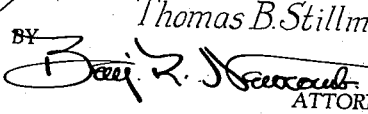
ATTORNEY.

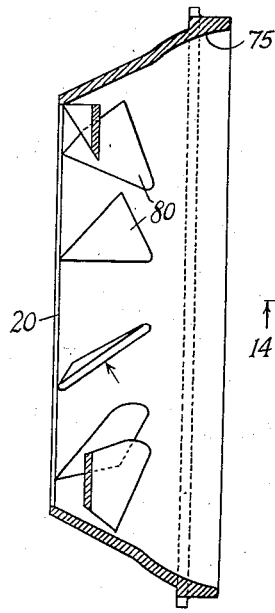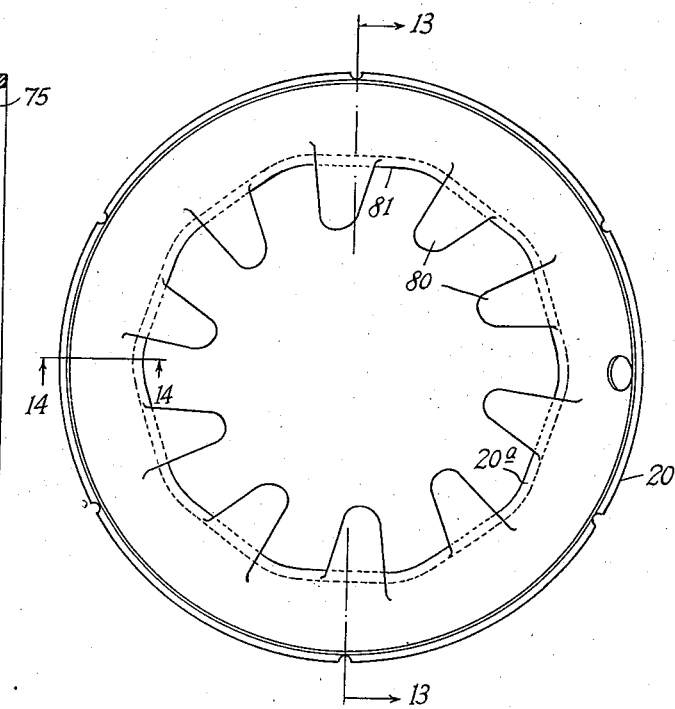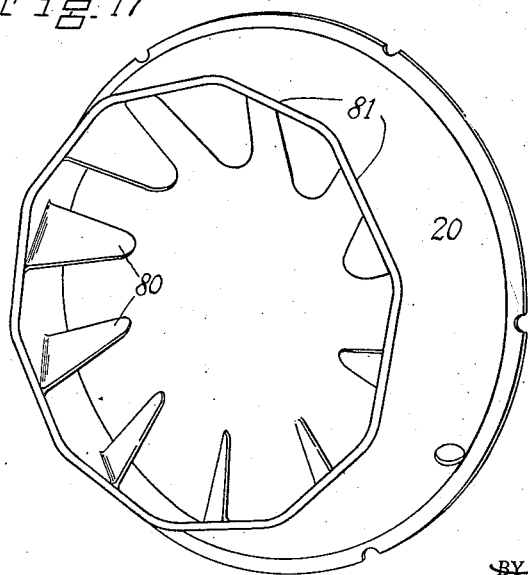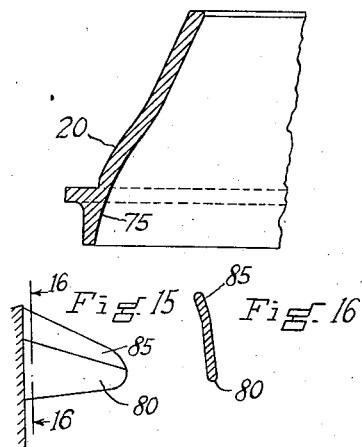

Oct. 21, 1941. T. B. STILLMAN 2,260,062
FUEL BURNER
Filed June 23, 1937 5 Sheets-Sheet 5
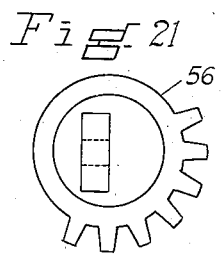
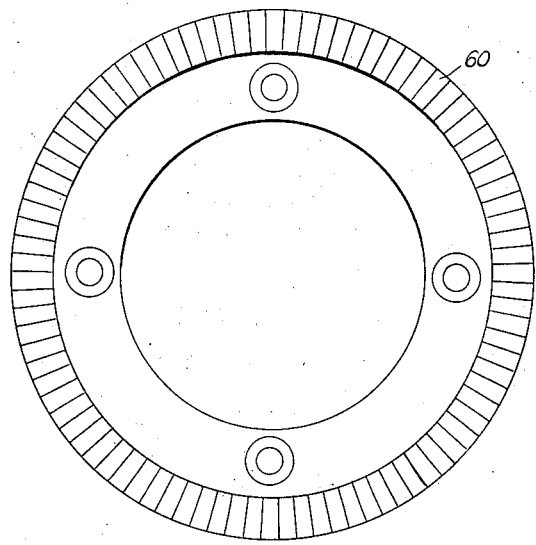
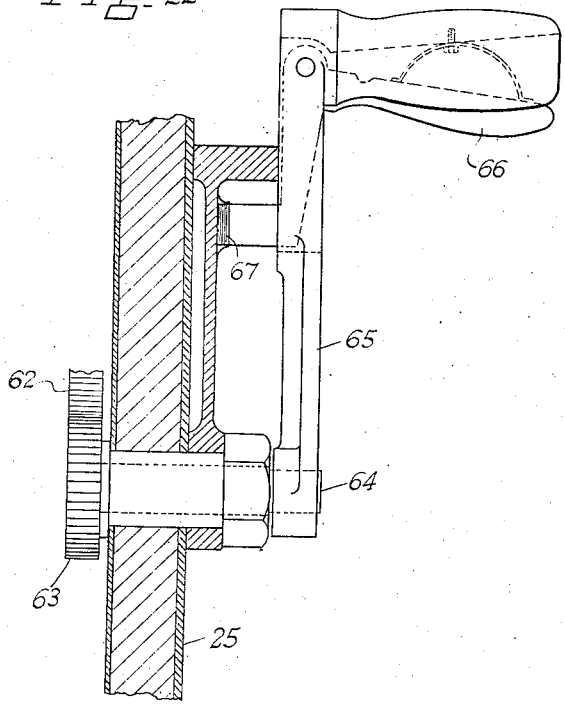
INVENTOR.
Thomas B. Stillman
BY
ATTORNEY.

Patented Oct. 21, 1941

2,260,062

UNITED STATES PATENT OFFICE 2,260,062

FUEL BURNER

Thomas B. Stillman, South Orange, N. J., assignor to The Babcock & Wilcox Company, Newark, N. J., a corporation of New Jersey Application June 23, 1937, Serial No. 149,822

14 Claims. (Cl. 158—1.5)

The present invention relates in general to the construction and operation of fluid fuel burning apparatus, and more particularly to improvements in the construction and operation of a fuel burner having a conical stream of fluid fuel delivered through a burner port into an air stream.

The main object of my invention is to provide a fluid fuel burner of the type described which is particularly characterized by a wide range of operation, low air pressure drop through the burner with complete combustion and low excess air to insure highest efficiency of utilization of heat, and clear steady flame conditions. A further and more specific object is to provide a fuel burner of the type described with an improved construction and arrangement of devices in the path of air flow for directing and controlling the flow of air through the burner and for mixing the flowing air with fuel discharged by the burner into the furnace.

For the most efficient use of the heat of combustion of fuel burned in the furnace, it is essential that all of the fuel be burned and with the least excess air, and in many cases it is highly important that the flame be also as short as possible. My invention provides means of attaining these objectives to a higher degree than has been possible heretofore. In accordance with the broader aspects of my invention, fuel in a fluid form is delivered through a fuel port coaxially with an air stream and preferably in such a way as to form a conical fuel stream and the fluid fuel may be of the pulverized solid, sprayed liquid, or gaseous kind.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of my invention for using liquid fuel.

Of the drawings:

Fig. 3 is an elevation, partly in section, of the sprayer barrel and discharge or sprayer head;

Fig. 4 is a vertical section of the sprayer plate;

Fig. 5 is a view of the outer or rear end of the sprayer plate shown in Fig. 4;

Fig. 6 is a sectional elevation of the air deflector cone;

Fig. 7 is an outer end view of the cone shown in Fig. 6;

Fig. 8 is an elevation of the diffuser cone;

Fig. 9 is an outer end view of the diffuser cone shown in Fig. 8;

Figure 1:
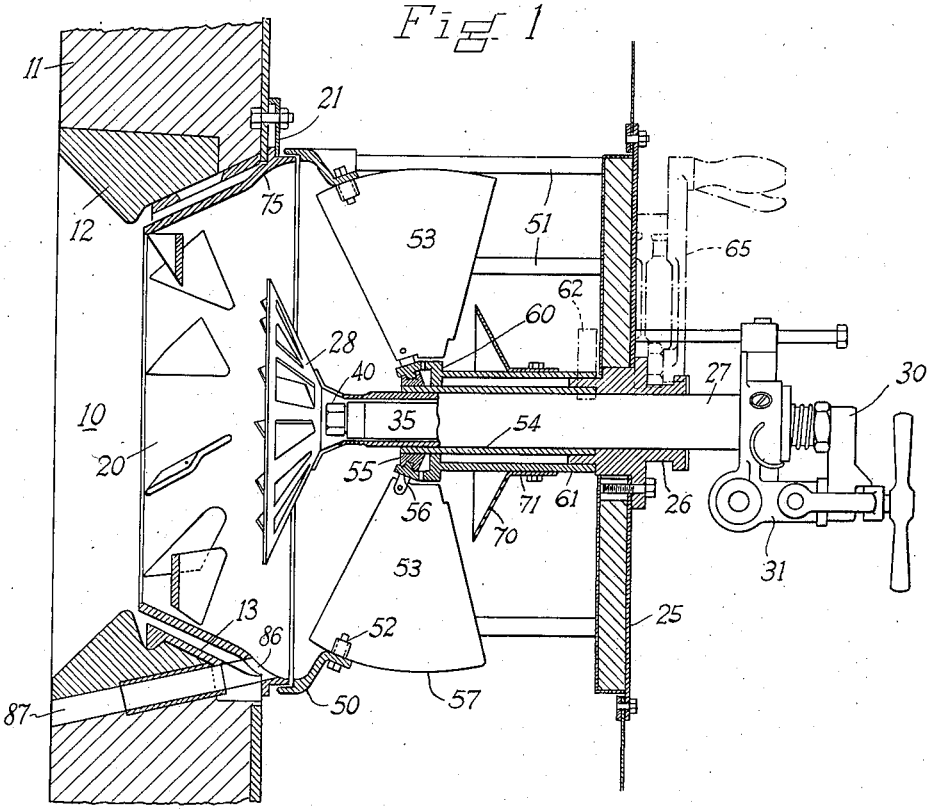
Fig. 1 is an elevation, partly in section, of a mechanical atomizing liquid fuel burner constructed in accordance with my invention, the burner air louvers or doors being shown in their open position.

Figs. 10 and 11 are sections taken on the lines 10—10 and 11—11 respectively, of Fig. 9;

Fig. 12 is an outer end view of the burner port ring;

Fig. 13 is a vertical section taken on the line 13—13 of Fig. 12;

Fig. 14 is a fragmentary section taken on the line 14—14 of Fig. 12;

Fig. 15 is a view of one of the port ring vanes taken in the direction of the arrow in Fig. 13;

Fig. 16 is a section through the ring vane taken on the line 16—16 of Fig. 15;

Fig. 17 is a perspective view of the port ring;

Fig. 18 is a sectional view through the burner showing the air louvers in their closed position;

Fig. 19 is an enlarged outer end view of one of the air louvers as shown in Fig. 18;

Fig. 20 is an enlarged inner end view of the air louver gear ring;

Fig. 21 is an enlarged plan view of one of the louver gear pinions; and

Fig. 22 is an enlarged plan view, partly in section, of the louver operating crank and pinion gear assembly.

In the drawings I have illustrated a liquid fuel burner mounted in a circular port 10 formed in one of the vertical walls 11 of a liquid fuel burning furnace. The port 10 is defined by segmental refractory tile 12 held in position in a circular opening in the wall by a frusto-conical grid 13. The port 10 so defined converges inwardly to an intermediate circular throat and then diverges to the inner or furnace side of the wall 11. An inwardly tapering metal ring member 20, hereinafter described in detail, extends into the port within the grid 13 and is held in position therein by peripheral clamps 21.

A double walled heat insulated cover plate 25 is coaxially arranged relative to and spaced from the outer end of the burner port ring and provided with a central hub member 26 through which extends a distance piece 27 in axial alignment with the port 10 and port ring 20. The inner end of the distance piece supports a bladed diffuser cone 28, shown in Figs. 8–11. The outer end of the distance piece 27 extends beyond the cover plate 25 and supports a valve assembly comprising a coupling 30 having its lower end detachably connected to a valve body 31 mounted on the distance piece. The valve body is connected to a source of liquid fuel and delivers the same through the coupling 30 to a sprayer barrel or extension piece 35, as shown in Fig. 3. The barrel 35 is arranged within the distance piece 27 with an axial fuel passage 36 therethrough to a sprayer head arranged within the outer end of the diffuser cone 28.

The sprayer head of the barrel 35 comprises a nozzle body 37 having a series of symmetrically arranged diverging passages 38 therein leading to a circular slot 39 in its inner face. The nozzle body is threaded on the inner end of the barrel and its inner end portion externally threaded to receive a sprayer tip or cap member 40 holding a sprayer plate 41 in contact with the nozzle body. The sprayer plate 41, as shown in Figs. 4 and 5, has a central whirl chamber 42 of circular cross-section which converges to a circular discharge orifice 43 at its inner or discharge end. The inner face 44 of the sprayer plate is dished and rounded to form a widely diverging continuation of the discharge orifice 43. The outer face of the sprayer plate has a series of narrow liquid fuel slots 45 therein symmetrically arranged tangentially to the whirl chamber 42 and providing communication between the circular slot 39 in the nozzle body and the whirl chamber. With the described construction, liquid fuel under pressure will pass through the barrel and sprayer head passages and be sprayed in a hollow cone of liquid fuel particles through the space within the diffuser cone 28, coaxially of and through the port ring 20.

A register ring 50 is mounted on the outer end of the port ring 20 and connected to the cover plate 25 by a circular series of supporting struts 51. As shown in Figs. 1 and 18, the outer end of the ring 50 carries a series of symmetrically arranged outwardly inclined pin bolts 52 forming pivot supports for the curved edge 57 of corresponding segmental shaped flat air louvers 53. A stationary sleeve 54 surrounds the distance piece 27 at the inner side of the cover plate 25 and at its inner end supports a pinion support ring 55. The ring 55 has a series of circumferentially spaced inwardly inclined holes therein in alignment with the axes and at the outer side of corresponding pivot bolts 52 and which receive stub shafts on segmental bevel gear pinions 56 which are mounted on the narrow edge 58 of the louver 53. Each louver 53 is thus pivotally mounted on an outwardly inclined axis adjacent one edge thereof arranged to intersect the axis of the barrel 35 at an angle of 70°. Each air louver has a projecting edge portion 59 which is arranged to overlap the adjacent edge of the next louver when the louvers are in their closed position and thus prevent the louvers being turned beyond this position. The louver pivot axes thus lie on a cone with the apex of the cone on the axis of the burner barrel.

Figure 2:
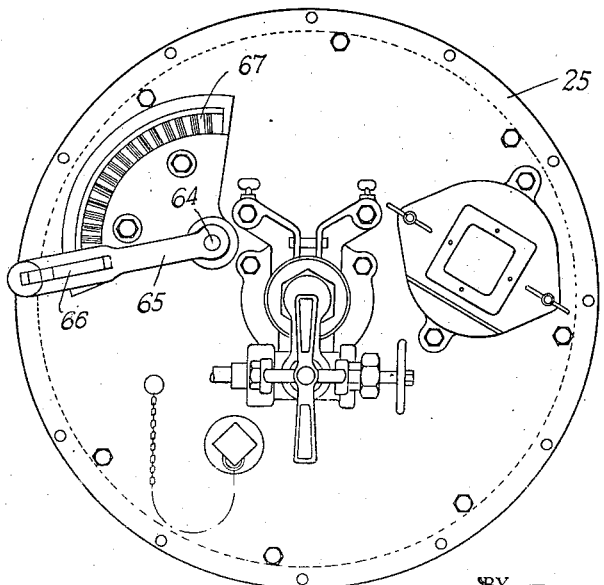
Fig. 2 is a view of the outer end of the burner shown in Fig. 1.

A gear ring 60 engaging the pinion gears 56 is mounted on the inner end of a rotatable sleeve 61 surrounding the sleeve 54 and having its outer end rotatable on the inner end of the hub 26. The sleeve 61 carries a segmental gear quadrant 62 on its outer end, which is engaged by a pinion gear 63 mounted on a shaft 64 extending through the cover plate 25, as shown in Figs. 1 and 22. The shaft 64 carries a crank 65 which is adapted to be moved in an arc across the front of the cover plate to vary the amount of opening and thereby the angular position of the pivoted air louvers 53. The crank may be set for any desired louver position by means of a trigger 66 engaging a toothed quadrant 67 mounted on the cover plate. In the arrangement shown in Figs. 1 and 2, the crank is at its extreme left position and the louvers in their fully open position in which they lie in planes including the axis of the burner barrel. In normal operation the air louvers will be partly open and effect a rotation of the air entering the openings between the louvers in a clockwise direction, as viewed from the outer side of the louvers.

In the burner construction shown, the combustion air will enter the space between the cover plate 25 and port ring 20 at all sides. To minimize concentration of the air at the center of the air louver assembly an air deflector cone 70 is mounted on and movable with the sleeve 61 at the outer side of the air louvers 53. As shown in Figs. 6 and 7, the deflector cone is formed in two segmental sections fitted closely together and forming a right cone with a base angle of about 30°. Hub extensions 71 on each cone section extend along the surface of the sleeve 61 and have slots 72 through which tap bolts 73 extend to permit adjustment of the deflector cone axially of the sleeve 61. It has been found desirable in operation to shift the deflector cone outwardly along the sleeve 61 with higher capacity operation of the burner.

The arrangement of the deflector cone 70 and the whirling effect given to the air stream by the louver arrangement described tend to concentrate the air stream along the inner periphery of the register ring 50 and the port ring 20. It has been found that the air flow conditions through the port ring are substantially improved by shaping these parts, as indicated in Figs. 1 and 14, to provide a convex bulged section 75 in the boundary surface of the air flow path at the discharge or inner edge of the louvers 53.

The central portion of the clockwise whirling air stream contacts with the diffuser cone 28 surrounding the discharge head of the barrel 35. As shown in Figs. 8–11, the diffuser cone is formed by a frusto-conical plate having a central opening 76 into which the sprayer head projects and a circular series of segmental blades 77 formed by bending out segmental portions of the plate, leaving passages 78 through the plate through which air may flow. On contacting with the diffused cone one portion of the air stream is deflected away therefrom by the conical plate surfaces around the passages 78, while another portion passes through the passages 78 and due to the arrangement of the diffuser cone blades receives an added whirling effect in a clockwise direction. This portion of the air stream mixes with the liquid fuel conical spray issuing from the burner discharge head and the expanding mixture of air and fuel is subsequently mixed with the portion of the air stream passing around the periphery of the diffuser cone adjacent to the walls of the port ring.

Port rings having angularly arranged vanes or blades thereon have heretofore been used in the furnace inlet port 19 for aiding the mixture of the liquid fuel spray and air. Such members were of an inwardly tapering frusto-conical shape with the angularly arranged vanes symmetrically spaced about the inner surface of the cone. In accordance with my invention, and as shown in Figs. 12 to 17, the inner or discharge end portion 20ᵃ of the port ring 20 is formed with a non-circular internal periphery, and as shown, flattened to form a flat-sided regular polygon. A decagonal shape is illustrated in the drawings for this exit portion of the port ring, the ring being preferably cast of a suitable temperature resisting alloy. The port ring also has a circular series of symmetrically spaced deflector vanes 80 welded to its inner periphery and corresponding in number to the number of sides 81 of the polygon. Each vane 80 is arranged at an angle of approximately 60° to the plane of the discharge edge of the cone. The inner edge of each vane 80 extends from a point on the inner edge of the ring midway of the corresponding side 81 at an outward inclination corresponding to the peripheral surface of a cone having a 45° base angle. Each vane inner edge is rounded off at its top and merges with the outer edge 84 which is straight and substantially normal to the corresponding portion of the ring at a point midway of its length. As indicated in Figs 15 and 16, the inner edge portion 85 of each vane is bent to provide a slight fillip. The described angular arrangement and form of the vanes 82 direct the exit air near the port ring walls in counter-clockwise direction. An opening 86 is formed in the bottom of the port ring below the diffuser cone 28 through which any liquid fuel dripping from the discharge head flows into a drain passage 87 in the wall 11 to the furnace.

Liquid fuel burners of the general class described are extensively used in marine steam boiler installations in which the air required for combustion is supplied by a fan under a variable pressure. The air pressure is varied with the operation of the burners and must ordinarily be substantially increased for operation of the burner at high capacities. It is highly desirable that the air pressure in such installations be kept at a low value over the entire range of burner operation to minimize the power required by the fan. The required air pressure depends mainly upon the pressure drop through the burner unit, and my invention involves the several features of burner construction described which jointly contribute to providing a relatively low pressure drop through the burner unit while appreciably increasing the ability of the burner to maintain furnace conditions for high efficiency over a wide range of operating capacity of the boiler.

Appreciably higher overall steam boiler efficiencies have been obtained with the described liquid fuel burner construction over a wide range of burner operation than with existing liquid fuel burners over the same range of capacities with the same boiler and furnace. These efficiencies were obtained with a substantially lower pressure drop through the burners and consequently a corresponding low fan delivery pressure. For example, when tested in a marine boiler with an oil rate of 985.8 lbs. per hr. per burner, the average $CO_2$ percentage was found to be 14.19%, the pressure drop through the burners 1.6 inches of water, and the boiler overall efficiency 81.54%. Efficient conditions were maintained up to the relatively high capacity of 1500 lbs. of oil per hr. per burner.

One of the main factors contributing to the high efficiencies obtained when this new burner is used is believed to be the described construction of the port ring 20, whereby an improved mixing of the entering fuel and air is believed to be obtained. The exact theoretical reasons for this improved mixing action are not known, but it is believed that with a port ring of circular cross-section at its exit end the outer or boundary layer of the fluid stream entering the furnace will be in the form of an annular sheet of air which has substantially the same linear and angular velocity and direction of motion over the whole of any cross-section. This outer layer is of greater importance than any other layer of equal radial thickness, because of the greater quantity of air in this layer due to its greater cross-sectional area. Substantially complete utilization of this outer layer of air is essential for completion of combustion with a minimum amount of excess air, but the desired degree of utilization has heretofore been impossible because in such prior constructions the fine liquid fuel particles entering the outer layer of air rapidly acquire the air velocity or reach the condition of zero relative velocity and move with the air. The sprayed fuel particles have a general forward and outward movement after being discharged into the air stream. As the rate of combustion of the individual liquid fuel particles depends upon the rate at which the enveloping layer of products of combustion generated is replaced by air, and this replacement is effectively accomplished by relative motion between the fuel particles and the air stream, the rate of combustion thereof will be substantially reduced when the zero relative velocity condition is reached. Under such conditions the combustion air must diffuse through the layer of combustion products around the fuel particles, and such diffusion is necessarily quite slow.

It is believed that with a non-circular perimeter for the inner or discharge end of the port ring the outer layer of the air stream is more completely utilized and the rate of combustion substantially accelerated. With the bladed polygonal formation of the port ring described the outer layer of air is divided into ten flat sheets leaving the discharge edge of the ring in differently positioned planes. Adjacent flat sheets will have approximately the same velocity but different planes of discharge, and each sheet will tend to overlap an adjacent sheet at least in part and create a turbulent condition in this overlap zone. Fuel particles moving outwardly into this outer layer of air, and particularly where such overlapping occurs, will be contacted by combustion air rapidly changing in direction, whereby increased relative motion of the fuel and air and an accelerated combustion rate is obtained.

The liquid fuel burner described has been found to maintain a high average $CO_2$ with corresponding low excess air and in steam boilers gives them high efficiencies throughout the wide range of operation required in marine usage. A clear steady flame is maintained by the burner under these conditions without any tendency to pulsate. The low pressure drop through the burner not only reduces the forced draft requirements but makes the burner particularly adapted for service in marine installations in which the boiler room is put under pressure.

While in accordance with the provisions of the statutes I have illustrated and described herein the best form of the invention now known to me, those skilled in the art will understand that changes may be made in the form of the apparatus disclosed without departing from the spirit of the invention covered by my claims, and that certain features of my invention may sometimes be used to advantage without a corresponding use of other features. Other sprayer means may be used for liquid fuel, and liquid fuel may be replaced by gas or by pulverized solid fuel discharged into the air stream, preferably in a conical stream, and the advantages of my invention will be obtained when the port ring perimeter is non-circular so as to divide the outer layer of air into a multiplicity of streams of different direction and partially overlapping to insure maximum utilization of the outer layer of air.

I claim:

1. In combination with a furnace wall having a fuel burner port therein, a fluid fuel burner nozzle constructed to discharge a stream of fluid fuel, means for directing combustion air around the discharge end of said burner nozzle and through said burner port, and a ring member mounted in said burner port, said ring member having a discharge edge section formed with a non-circular internal perimeter, and a series of deflector vanes on the inner surface of said ring member arranged to extend at an oblique angle to the plane of the discharge edge.

2. In combination with a furnace wall having a fuel burner port therein, a fluid fuel burner nozzle constructed to discharge a stream of fluid fuel, means for directing combustion air around the discharge end of said burner nozzle and through said burner port, and a substantially frusto-conical ring member mounted in said burner port, said ring member having a discharge edge section formed with a convex polygonal internal perimeter, and a series of deflector vanes on the inner surface of said ring member, each deflector vane being arranged to extend across a corresponding side of the discharge edge section at an oblique angle to the plane of the discharge edge.

3. In combination with a furnace wall having a fuel burner port therein, a fluid fuel burner nozzle constructed to discharge a conical stream of fluid fuel, means for directing combustion air around the discharge end of said burner nozzle and through said burner port, and a substantially frusto-conical ring member mounted in said burner port in axial alignment with the discharge end of said burner nozzle, said ring member having a discharge edge section formed with a flat sided regular polygonal internal perimeter, and a series of symmetrically spaced deflector vanes on the inner surface of said ring member, each vane being arranged to extend across a corresponding flat portion of said discharge edge section at an oblique angle to the plane of the discharge edge.

4. In combination with a furnace wall having a fuel burner port therein, a liquid fuel burner having a discharge head constructed to discharge a conical stream of finely divided liquid fuel therethrough, means for directing combustion air around said discharge head and through said burner port, and a substantially frusto-conical ring member mounted in said burner port in axial alignment with said discharge head, said ring member having a discharge edge section formed with a flat sided regular decagonal internal perimeter, and a series of symmetrically spaced deflector vanes on the inner surface of said ring member with the furnace end of each blade arranged to extend across a corresponding flat portion of said discharge edge section at an oblique angle to the plane of the discharge edge.

5. A fuel burner port ring having a discharge edge section formed with a flat-sided regular polygonal internal perimeter.

6. A fuel burner port ring having a substantially frusto-conical body with a discharge edge section formed with a non-circular internal perimeter, and a series of deflector vanes on the inner surface of said discharge edge section arranged at an oblique angle to the plane of the discharge edge.

7. A fuel burner port ring having a substantially frusto-conical body with a discharge edge section at its smaller end formed with a convex polygonal internal perimeter, and a series of deflector vanes on the inner surface of said ring body and each vane arranged to extend across a corresponding side of said discharge edge section at an oblique angle to the plane of the discharge edge.

8. A fuel burner ring having a substantially frusto-conical body with a discharge edge section at its smaller end formed with a flat-sided regular polygonal internal perimeter, and a series of symmetrically spaced deflector vanes on the inner surface of said ring body and each vane arranged to extend across a corresponding flat portion of said discharge edge section at an oblique angle to the plane of the discharge edge.

9. A fuel burner port ring having a substantially frusto-conical body with a discharge edge section at its smaller end formed with a flat-sided regular decagonal internal perimeter, and a series of symmetrically spaced deflector vanes on the inner surface of said ring body.

10. A fuel burner port ring having a substantially frusto-conical metallic body of heat resistant alloy with a discharge edge section at its smaller end formed with a flat-sided regular decagonal internal perimeter, and a series of symmetrically spaced deflector vanes on the inner surface of said ring body and each vane arranged to extend across a corresponding flat portion of said discharge edge section at an oblique angle to the plane of the discharge edge.

11. A liquid fuel burner comprising an elongated barrel having a discharge head at one end thereof arranged to discharge a conical stream of liquid fuel, a port ring at the discharge end of said barrel and coaxial with said discharge head, a series of deflector vanes symmetrically spaced and obliquely arranged on the inner surface of said ring, a bladed diffuser cone at the discharge end of said barrel at the outer side of said ring vanes, a circular series of segmental air louvers surrounding said barrel at the outer side of said diffuser cone, pivot means adjacent one edge of said louvers providing turning axes for said louvers oblique to and intersecting the axis of said barrel, a segmental pinion gear for each louver, a pinion ring surrounding said barrel and in operative engagement with said pinion gears, a cover plate at the outer end of said barrel, and means at the outer side of said cover plate for turning said pinion ring.

12. A liquid fuel burner comprising an elongated barrel having a discharge head at one end thereof arranged to discharge a conical stream of liquid fuel, a substantially frusto-conical port ring at the discharge end of said barrel and arranged coaxially with said discharge head, a register ring at the outer end of said port ring, a circular series of segmental air louvers surrounding said barrel and pivotally mounted in said register ring, means for moving said louvers about their axes, and said register and port rings being shaped to form an enlarged convex portion at the inner side of said louvers.

13. A liquid fuel burner comprising an elongated barrel having a discharge head at one end thereof arranged to discharge a stream of liquid fuel, a port ring at the discharge end of said barrel and coaxial with said discharge head, a series of deflector vanes symmetrically spaced and obliquely arranged on the inner surface of said ring, a circular series of segmental air louvers surrounding said barrel at the outer side of said port ring, pivot means providing turning axes for said louvers intersecting the axis of said barrel, means for moving said louvers about their axes, and a deflector cone surrounding said barrel at the outer side of said louvers and arranged to deflect air away from the center of said louver series.

14. A liquid fuel burner comprising an elongated barrel having a discharge head at one end thereof arranged to discharge a conical stream of liquid fuel, a port ring at the discharge end of said barrel and coaxial with said discharge head, a series of deflector vanes symmetrically spaced and obliquely arranged on the inner surface of said ring, a bladed diffuser cone at the discharge end of said barrel and at the outer side of said ring vanes, a circular series of segmental air louvers surrounding said barrel at the outer side of said port ring, pivot means providing turning axes for said louvers oblique to and intersecting the axis of said barrel, a cover plate at the outer end of said barrel, means at the outer side of said cover plate for moving said louvers, and an axially adjustable deflector cone surrounding said barrel between said louvers and said cover plate and arranged to deflect air away from the center of said louver series.

THOMAS B. STILLMAN.